Sept. 7, 1965  J. E. LINDBERG, JR  3,205,329
SENSITIVE PRESSURE-RESPONSIVE DEVICE
Original Filed July 13, 1961

INVENTOR.
JOHN E. LINDBERG, JR.
BY
Owen, Wickersham & Erickson
ATTY'S

United States Patent Office 3,205,329
Patented Sept. 7, 1965

3,205,329
SENSITIVE PRESSURE-RESPONSIVE DEVICE
John E. Lindberg, Jr., 1211 Upper Happy Valley Road,
Lafayette, Calif.
Original application July 13, 1961, Ser. No. 126,437.
Divided and this application Aug. 6, 1963, Ser. No. 304,714
3 Claims. (Cl. 200—140)

This application is a division of application Serial No. 126,437, filed July 13, 1961.

This invention relates to an improved apparatus for heat detection and especially fire detection. More particularly it relates to a novel responder means.

The present invention is an improvement of the apparatus described and claimed in my copending application, Serial No. 102,622, filed Apr. 10, 1961, now abandoned. That application provides a novel non-electric heat-detecting element or sensor located in a heat-detection zone and connected outside the zone to an electrical warning or corrective system by a novel instrument called a responder. The sensor may be filamentary—a long, very-narrow-diameter, hollow tube, which may extend along a line, around a circle, or along any desired path and for practically any desired length. Also, the actual alarm or heat-conduction indicator can be connected to the responder by a wire of practically any desired length. For example, the heat-detecting sensor may be inside a house, the responder just outside the house, and the indicator at the fire station. Or, the non-electric heat-detecting sensor may be in zone 1 of an aircraft engine ahead of a fire wall, the responder may be behind the fire wall, and the indicator may be on the aircraft instrument panel.

An object of this invention is to provide a responder having unusually good response characteristics and, in particular, an accelerated snap action.

Other objects and advantages of the invention will appear from the following description of some illustrative embodiments thereof.

Figure 1:
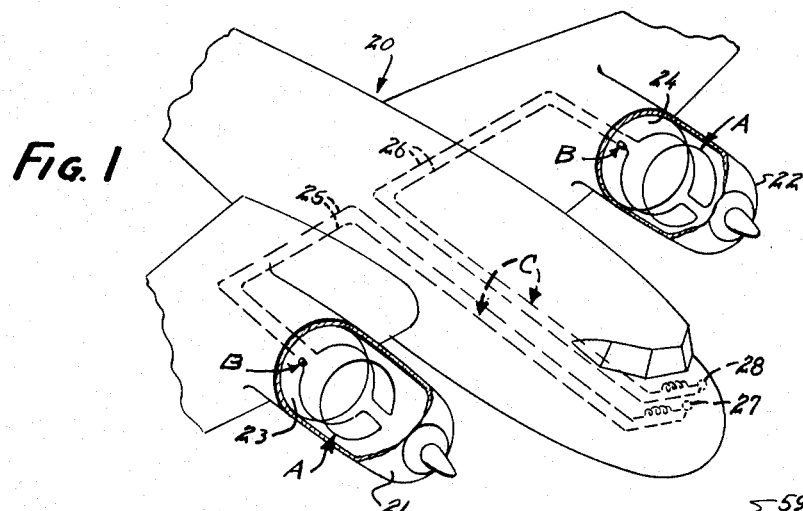
FIG. 1 is a diagrammatic fragmentary view in perspective of a portion of an aircraft containing a fire-detection and warning device embodying the principles of this invention.

As shown in FIG. 1, the fire-detection system with which this invention may be used preferably comprises (1) a non-electric detection means, preferably in the form of a generally filamentary sensor A of some desired length, (2) a responder B, and (3) an electrical circuit C. The function of the sensor A is to actuate the responder B, which in turn actuates the electrical circuit C. Thus, the sensor A constitutes a heat-to-pressure transducing means, while the sensor A and the responder B, considered together, comprise a heat-to-electric-current transducer.

The sensor A may be further defined in general terms (see FIGS. 3 and 4) as a generally filamentary enclosure D of extended length connected to the responder B and containing means E responsive to heat in the environment of the sensor A, for raising the internal pressure in the responder B. The responder B is a type of pressure-actuated electrical switch that opens or closes in response to the pressure changes induced by the response of the sensor A to heat. The electrical circuit C may be a warning circuit or a remedial circuit.

The system of this invention has many features especially suitable to use in aircraft. Just to give a general picture that can be referred to from time to time, FIG. 1 presents an aircraft 20 in which two systems of this invention are installed. Two sensors A are used, one for each of two engine nacelles 21, 22 of this airplane 20. The sensors A are disposed at critical locations in the nacelles 21, 22, usually around the engines, and the responders B are mounted on the fire walls 23, 24. The circuits C include conductors 25, 26 leading to respective lights 27, 28 on an instrument panel. Fire at either engine nacelle 21 or 22 heats the sensor A therein and causes its associated responder B to close its associated circuit C, thereby lighting the light 27 or 28.

The sensor A includes a narrow-diameter metal tube D of constant cross-sectional area and of any desired length. Within this tube D is means E responsive to the temperature of the tube D for varying the pressure inside the tube or enclosure D. This means E may also be termed a transducing agent or a gas-transfer or gas-emitting agent. The enclosure D is gas-tight and its only opening is connected to the responder B, which itself defines a closed chamber connected to the enclosure D. An alteration of the internal pressure within the enclosure D therefore affects the internal pressure within the responder B.

The sensor with which this invention is used preferably employs the transducing agents E that retain gas at low temperature and emit gas progressively over a wide range of elevated temperatures. They are set out in detail in my copending application, Serial No. 102,622, now abandoned, to which reference may be had for complete details. These transducing agents E release or emit large volumes of gases or vapors when elevated to a temperature sought to be detected and take them up again when the temperature is reduced.

Among suitable materials for the transducing agent E are many metallic hydrides. With the alkali and alkaline earth metals, i.e., groups I–a and II–a of the periodic table, hydrogen forms stoichiometric compounds such as sodium hydride and calcium hydride. These are ionic in behavior, with hydrogen as the negative ion. The reactions are reversible and exothermic. Specifically, hydrogen reacts with lithium, sodium, potassium, rubidium, cesium, calcium, radium, strontium, francium, and barium, in stoichiometric proportions to form hydrides. With the elements of Groups III–a (including the rare earth and actinide elements), IV–a and V–a, hydrogen forms pseudo-hydrides. The solubility of hydrogen in elements of these groups varies as the square root of the pressure, and it decreases with increase in temperature. Above about 300° C., palladium also behaves in this way. Elements of these groups are designated as "Group B," the class consisting of scandium, titanium, vanadium, ytterbium, zirconium, niobium, hafnium, tantalum, the rare earth metals (atomic numbers 57 through 71), and the actinide metals (atomic numbers 89 through 103); palladium being a member of this group at temperatures greater than about 300° C. This solution is commonly termed a "hydride," though it is not a stoichiometric compound.

My co-pending application, Serial No. 815,406, (now Patent No. 3,122,728), illustrates a few of the many ways in which the sensor A may be constructed. Transducing agents E may be used in a filamentary, pellet, or granular form, always being placed inside the sensor tube D, which is a non-porous electrically conductive tube, preferably of constant cross-sectional area. Suitable metals are nickel, pure iron (which is impermeable to many gases), stainless steel, and molybdenum, for example. In any event, the inner surfaces of the tube D should not react with the materials it contacts, including the gas involved. A typical sensor tube D is preferably about 0.040″ to 0.060″ outside diameter with a wall thickness of preferably about 0.005″ to 0.015.″ Such tubes D are preferably about two to thirty feet long, although they may be longer or shorter.

Figure 4:
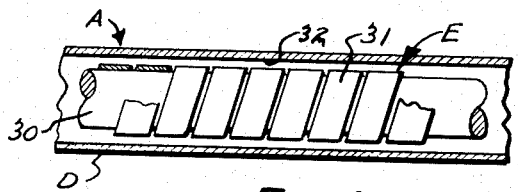
FIG. 4 is a greatly enlarged view in elevation and in section of a portion of one preferred form of heat-detection sensor.

FIG. 4 shows a preferred form of transducing agent E enclosed in the sensor tube D. Here the transducing agent E is a filament 30, such as zirconium or titanium or calcium wire and may be about 0.025″ to 0.050″ in diameter, for example. A ribbon 31 of suitable material, such as molybdenum, preferably about 0.020″ wide and 0.002″ thick, is wrapped tightly around the filamentary transducing agent 30. The ribbon 31 physically spaces the filament 30 from contact with the walls 32 of the tube D and prevents the transducing agent 30 from fusing or welding to the tube walls 32, even in the event that the sensor A is exposed to extreme heat and even if the filament 30 is fully ingassed, so that it is enlarged to nearly the internal diameter of the tube D.

As a simplified example of installation of the sensor A of FIG. 4 to the responder B, one end 33 (FIG. 3) of the tube D may be connected by a gas-tight seal to the responder B, while the other end 34 of the tube D is still open. This free end 34 may be connected to a vacuum pump and the tube D pumped free of gas. Then the tube D is heated, and then pure hydrogen is forced in through the free end 34, the zirconium filament 30 absorbing the hydrogen while it cools. The originally pure metal 30 is converted into an ingassed hydride. The free end 34 is then sealed off as by inserting a wire 35 and fusing it to the tube D, and the device is ready for operation.

Figure 3:
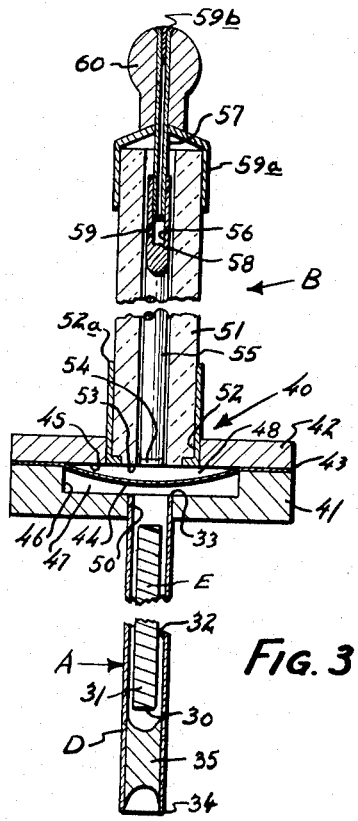
FIG. 3 is a further enlarged view in elevation and in section of the novel responder of FIG. 2, showing also a portion of the sensor.

FIG. 3 shows one preferred form of responder B. This responder B comprises a unit 40 and has two circular plates 41 and 42, of non-porous metal, preferably molybdenum or "Kovar," between which is bonded (as by brazing) a thin metal (e.g., molybdenum or "Kovar") flexible disc of diaphragm 43. (According to Handbook of Material Trade Names, 1953 Edition, published by Industrial Research Service at Dover, New Hampshire, "Kovar" is a registered trademark for an alloy of 20% nickel, 17% cobalt, 0.2% manganese, and the balance iron.) The plates 41 and 42 are hermetically sealed together and are in electrical contact for their full peripheries and over a substantial margin, but in the center the diaphragm 43 has a generally spherical-segment depression 44 called a "blister," which is free to move relative to the plates 41 and 42 and constitutes the active or movable part of the diaphragm 43. Use of a diaphragm with a blister 44 makes possible the use of an upper plate 42 with a planar lower surface 45 and gives a more predictable response, but other diaphragm structures may be used where feasible. The lower plate 41 is formed with a recess 46 in its upper surface, and the diaphragm 43 divides the resultant cavity between the plates into two regions or chambers 47 and 48. Since the lower region 47 communicates with the sensor A, it may be called the "sensor chamber." The other region 48 is located on the opposite side of the diaphragm 43 from the sensor A; so it may be called the "anti-sensor chamber." Of course, either plate 41 or 42 may actually be made by brazing together several thin plates of the desired configuration, and the recess 46 may be provided by using a stack of preformed thin washers over a disc.

The end 33 of the sensor tube D is joined to and hermetically sealed to the lower plate 41, fitting within a hole 50. The region 47 is closed and sealed except for its communication with the lumen of the sensor tube D; so the inside of the sensor A and the sensor chamber 47 enjoy a common atmosphere to the exclusion of any other.

A tube 51 of non-porous ceramic material or other non-porous electrically-insulating material extends through a stepped opening 52 provided by a metal tube 52a that is brazed into the upper plate 42 flush with the surface 45, the tube 51 being hermetically sealed in place with its lower end 53 flush with the bottom surface 45 of the plate 42. The hole 52 and tube 51 are preferably centered with respect to the blister 44. A metal electrode tip 54, preferably of palladium or other metal that actively outgasses hydrogen when heated in the temperature range involved is provided as the lower end of a metal rod 55, preferably of molybdenum, inside the tube 51, the electrode 54 being a contact portion of the rod 55 that lies flush with (or very slightly below) the lower surface 45 of the plate 42.

If sufficient pressure is applied to the sensor side of the blister 44, the blister will be deflected and will make contact with the electrode portion 54, and if the deflecting force is removed, the restoring force of the blister 44 will return it to its relaxed position and thus break contact with the electrode portion 54. The force necessary to deflect the blister 44 may be chosen by proper design to accommodate a wide range of values.

The outer end of the molybdenum rod 55 is drilled axially to provide a receptacle 56 within which fits the end of a nickel capillary tube 57, which is secured to the rod 55, as by a cuplat braze, at a location short of the lower end 58 of the receptacle. A hole 59 extends radially through the wall of the receptacle 56 in between the receptacle end 58 and the end of the tube 57. A cap 59a, preferably of "Kovar" or molybdenum, is brazed to the ceramic tube 51 and to the capillary tube 57, and the lengths of the tubes 51 and 57 and the rod 55 are carefully chosen to match the coefficients of expansion and the lengths of the two metal members 55 and 57 to the coefficient of expansion and the length of the member 51. It is important to keep the lower end 54 of the contact rod 55 from moving above the surface of the plate 42. With the relative lengths of the molybdenum and nickel parts chosen so that their expansion and contraction exactly cancel those of the ceramic tube 51, whose coefficient of expansion lies between those of nickel and molybdenum, this distance is easily maintained.

The cylindrical rod 55 of molybdenum fits fairly snugly into the bore of the ceramic tube 51, while still leaving sufficient clearance for gas passage. The radial hole 59 enables passage of hydrogen gas or a mixture of hydrogen and a noble gas, such as argon or neon, through the capillary tube 57 into the ceramic tube 51. Hence, the nickel tube 57 may be used to introduce gas under pressure into the anti-sensor chamber 48 to provide any desired pressure there, with resultant effect on the response characteristics of the blister 44. It may then be closed off by inserting a wire 59b in its outer end and brazing it to the tube 57. Then the tube 57 may be brazed to an electrical jack or socket member 60. Thus, when the blister 44 contacts the electrode 54, electric current can pass from the blister 44 to the rod 55, the tube 57, and the socket 60, to which the electric warning circuit C is connected.

Figure 2:
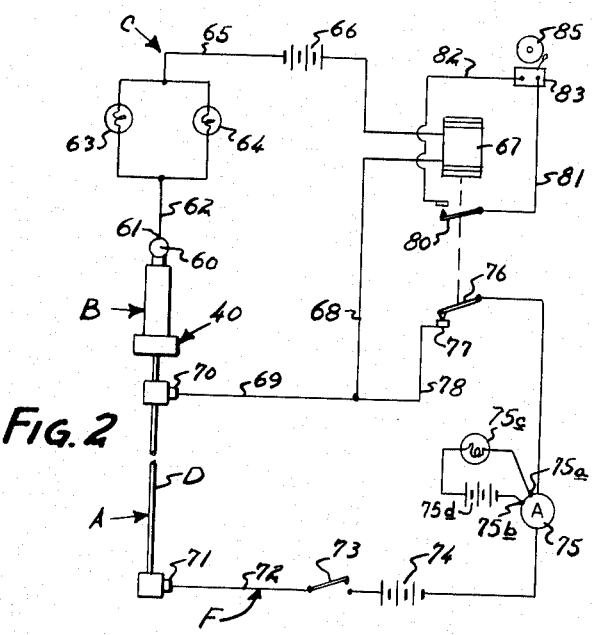
FIG. 2 is an enlarged view in elevation and partly in section of a fire detection system as used in FIG. 1, showing the responder, a heat detection sensor broken in the middle in order to conserve space, and a circuit diagram.

A preferred electrical warning circuit C is shown in FIG. 2. It will be seen that a connector 61 engages the socket 60 and from it a lead 62 extends to two lamps 63 and 64 in parallel with each other and in series with the lead 62 and a lead 65, which leads to one side of a battery 66. The other side of the battery 66 leads through a relay 67, and, by leads 68 and 69, is connected to a terminal 70 on the sensor tube D, near the responder B.

A test circuit F is also provided. A second terminal 71 on the far end of the sensor tube D is connected by a lead 72 to a test switch 73, which is connected to a second battery 74. The other side of the battery 74 is connected through an ammeter 75 to one pole 76 of the relay 67. The pole 76 is normally closed against a contact 77 that is connected by a lead 78 to the leads 68 and 69. A second pole 80 connects and disconnects leads 81 and 82 of a bell relay 83. The body D of the sensor A is a good electrical conductor, so that even with many feet of it the total resistance will be low, only about one to ten ohms. Thus an ungrounded circuit is provided through the sensor body D between the terminals 70 and 71.

When the blister 44 is not in contact with the electrode 54, the circuit through the battery 66 is open, and it cannot light the lamps 63 and 64 or ring the bell 85. Whenever there is a fire or heat condition such as to emit sufficient gas inside the sensor A, the pressure in the sensor chamber 47 builds up and closes the blister 44 against the electrode 54, closing the circuit through the battery 66 and lighting the signal lamps 63 and 64 and ringing the bell 85.

A novel feature of the responder 40 is that the electrode tip 54 is of metal hydride or metal with dissolved hydrogen gas that emits that gas when heated; therefore, after a blister in contact with the tip 54 begins to move away from the tip, if it moves so slowly as to cause arcing, the resultant heat causes the palladium or other "hydride" to emit hydrogen, thereby increasing the gas pressure in the anti-sensor chamber 48 and snapping the blister 44 away from the electrode tip 54.

While the two-lamp, one-bell circuit is preferred, it will be apparent that, instead, there may be only a single lamp. The important thing is that there is an ungrounded circuit with a warning device in series with the responder B and sensor body D. That is, in essence, the warning circuit C. Two 2.5 volt lamps 63 and 64 and a 2.5 volt bell 85 are preferred to a single lamp to help get a high-current, low-voltage circuit, which is trouble free, because of the current-voltage values and because even when one lamp burns out, another is present to give the warning.

For testing the circuit of FIG. 2, the switch 73 is closed. The sensor element E is then heated electrically by the current passing from the battery 74 directly through the metal tube D. I may, however, use other means for heating the tube D and the sensor E electrically, and one such method will be discussed later with reference to FIGS. 13 and 14. The heat is uniformly distributed along the sensor A, which normally contains a noble gas (such as neon or argon) in addition to the hydride E. The sensor A may be adjusted so that if all of it is above a certain critical temperature, the expansion of the noble gas itself will suffice to move the blister 44 against the electrode tip 54. This temperature may be termed the "all-point." Then, if most of the sensor A is below this all-point, the responder B may still be actuated by a rise of a portion thereof above the gas-emission point of the hydride E, by a desired amount. For testing, the all-point may be used, and when the temperature of the sensor A reaches the all-point temperature for which it has been set, the responder B completes the alarm circuit, lighting the warning lamps 63 and 64 and actuating the relay 67. The relay 67 then breaks the current in the test circuit by moving the pole 76 away from the contact 77. With the flow of current in the test circuit F stopped, the sensor A cools off, finally reaching the point at which the responder B opens the alarm circuit, releasing the relay 67. This restores the flow of current in the test circuit F, so that the sensor A again heats up. The cycle is repeated as long as the test switch 73 is kept closed.

The intermittent flashing of the warning lights 63, 64 during the test indicates that the system is in good order. If there is a break in the sensor A or a fault in some other part of the system, the warning lamps 63, 64 will not light during the test, indicating that something is wrong with the system. Since it is the gas pressure in the sensor A which actuates the responder B during the test cycle, this test method gives a true test of the entire fire detector system by producing actual high temperature conditions in the sensor.

The test switch 73 may be kept closed at all times during flight, giving a continuous test, without in any way hampering the unit's effectiveness as a fire detector. If a fire condition exists in the vicinity of the sensor A, then the responder B keeps the alarm circuit C closed, and the warning lamps 63, 64 burn continuously, indicating an excessive temperature condition. During the time the system is indicating a fire, the relay 67 prevents current from flowing in the test circuit F. Actually, the continuous use of this test circuit F may improve the response rate of the detector; since the sensor is maintained at a fairly high temperature all the time, it takes less time for a fire to heat the sensor A up to the point at which it gives a warning.

The environmental temperature of the sensor A determines how long it takes for the sensor A to heat up when the test current is on and to cool off when the test current is off. The higher the environmental temperature is, the shorter the heating-up time and the longer the cooling-off time. Therefore the average current, averaged over each test cycle, decreases as the environmental temperature is raised. If an ammeter 75 with a long time-constant (highly damped) is placed in series with the test circuit F, as shown in FIG. 2, it will perform the proper averaging and can be calibrated to read the actual environmental temperature of the sensor directly.

If it is desired that a warning be given when the environmental temperature reaches some overheat point below the all-point temperature, the ammeter 75 may be fitted with contacts 75a and 75b so that an external warning circuit 75c including a battery 75d is closed when the current indicated by the meter 75 drops below that corresponding to the overheat temperature. Meters fitted with such contacts are commercially available.

If the fire detector is faulty for some reason, then the relay 67 in the alarm circuit C will not break the current in the test circuit F. The average current indicated by the ammeter 75 will then rise to a high value, indicating that the system has failed. If desired, the additional set of contacts 75a and 75b may be set to close the external circuit 75c when the current indicated by the meter 75 exceeds a certain value, in order to give a warning that there is a fault in the system, or two sets of such contacts may be provided.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A very sensitive pressure-responsive device, including in combination: a housing; a metal diaphragm in said housing and dividing said housing into first and second chambers, said diaphragm having an area whose peripheray is rigidly fixed to said housing, said area being deformed into a blister that flexes in response to pressure in said first chamber, and an electrode supported by said housing in said second chamber and electrically-insulated therefrom directly opposite and centrally located with respect to said blister on the side thereof away from which said blister is normally deflected and having a tip of metal of the type that outgasses hydrogen when heated, said metal tip being ingassed with hydrogen, whereby deflection of said blister to a position causing arcing between said tip and said electrode heats said tip and causes it to outgas, increasing the pressure in said second chamber, thereby snapping said blister away from said electrode.

2. A very sensitive pressure-responsive device, including in combination: a housing; a metal diaphragm in said housing and dividing said housing into first and second chambers, said diaphragm having a circular area whose periphery is rigidly fixed to said housing, said area being deformed into a blister that flexes in response to pressure in said first chamber, and an electrode supported by said housing and electrically-insulated therefrom directly opposite and centrally located with respect to said blister on the side thereof away from which said blister is normally deflected and having a palladium tip ingassed with hydrogen, whereby when arcing occurs between said blister and said electrode, said tip is heated, which thereupon emits hydrogen, increasing the pressure in said second chamber and snapping said blister away from said electrode.

3. A very sensitive pressure-responsive device, including in combination: a housing; a metal diaphragm in said housing and dividing said housing into first and second chambers, said diaphragm having a flexing area that flexes in response to pressure in said first chamber, and an electrode supported by said housing in said second chamber and electrically-insulated therefrom directly opposite said flexing area and having a tip of metal ingassed with hydrogen and of the type that outgasses hydrogen when heated, whereby arcing between said tip and said area heats said tip so that it outgasses hydrogen and increases the pressure in said second chamber, thereby snapping said area away from said electrode.

No references cited.

BERNARD A. GILHEANY, *Primary Examiner.*